United States Patent [19]

Tabor

[11] Patent Number: 4,655,910
[45] Date of Patent: Apr. 7, 1987

[54] LIQUID FILTERING DEVICE
[75] Inventor: Elhanan Tabor, Carmiel, Israel
[73] Assignee: AR-KAL Plastics Products Beit Zera (1973), Israel
[21] Appl. No.: 848,308
[22] Filed: Apr. 4, 1986
[30] Foreign Application Priority Data
  Apr. 15, 1985 [IL]  Israel ........................ 74908
  Oct. 4, 1985 [IL]  Israel ........................ 76570
[51] Int. Cl.⁴ ............................... B01D 29/02
[52] U.S. Cl. ..................... 210/107; 210/354; 210/393
[58] Field of Search ............ 210/107, 108, 354, 355, 210/393, 411, 412

[56] References Cited
U.S. PATENT DOCUMENTS
  2,440,384  4/1948  Schenke ..................... 210/355
  4,042,504  8/1977  Drori ........................ 210/355
  4,045,345  8/1977  Drori ........................ 210/107
  4,271,018  6/1981  Drori ........................ 210/354

Primary Examiner—John Adee
Attorney, Agent, or Firm—Ostrolenk, Faber, Gerb & Soffen

[57] ABSTRACT

Liquid filter devices, particularly for irrigation systems are known to comprise automatic, periodic reverse-flow rinsing arrangements, whereby water is flushed in the opposite direction to release clogged particles from the filter member. The disclosed devices utilize the reverse, flushing water flow to release the filter member of the device from its normal, stationary position, and rinse it by jets. The jets are also useful to impart a rotatable movement to the filter member. In the case of disc filters, the discs become released and spaced from each other, and individually spin during the rinsing thereof.

14 Claims, 15 Drawing Figures

LIQUID FILTERING DEVICE

BACKGROUND OF THE INVENTION

The present invention relates to filters, particularly for irrigation purposes, but also applicable to other industrial or domestic uses.

Modern agricultural irrigation is mostly based on drip irrigation systems, which requires the water to be free of particles and other impurities that will tend to clog the system. The same applies to microjets and sprinklers irrigation. For this purpose, there have been developed various types of filters, such as metal or plastic cylindrical screen filters, or disc filters, which are based on a pack of side-by-side juxtapositioned discs, made of plastic material. The surfaces of the discs are roughened to various grades, down to a depth of only a few microns. The pack of discs is mounted on a central, cylindrical support and the whole structure is housed in a casing having inlet and outlet ports. Water is admitted at the outer circumference of the pack of discs and is made to flow between the engaging surfaces of the discs in an inwards radial direction, and discharged at the inner axial space from which it is discharged to the irrigation lines (or vice-versa). Solid particles and other impurities remain trapped between the discs. Usually a battery of, say, five to fifteen such filters are connected in parallel to feed a single irrigation main line.

The general construction and mode of operation of screen filters are similar in those respects to disc filters. Now, it is common practice to rinse every filter of the battery once in a while, to avoid its complete clogging. This is done by bypassing one of the filters of the battery and causing a reverse water flow there through. Thus, filtered water supplied by the other filters is directed under the network pressure in the opposite direction, namely from the axial space enclosed by the pack of discs (or screen) in the outwards, radial direction. Such flushing operation will cause solid particles to be ejected from between the discs (or the outer surface of the screen). This rinsing procedure is periodcally maintained, once every few hours for one or two minutes, with respect to every filter of the battery, controlled by the automatic control irrigation system.

It has however been found that—with respect to the disc filters in particular—this reverse flushing method does not provide an effective solution to the clogging problem of the filters. The reverse flushing water did not always cause the release of all solid particles from the roughened surfaces of the discs, and mainly failed to remove slimy or sticky substance accumulated therebetween. Therefore, after an extended period of time, even though the rinsing cycles were maintained, filters ceased to function properly and had to be replaced or dismantled and manually cleaned. It is thus the major object of the present invention to overcome the clogging problem of filters with reverse flushing facilities.

It is a further object of the invention to provide automatic, hydraulically-operated means for slackening the engagement between the discs of disc filters during the reverse flushing operation, and compacting same during normal operation of the filter.

It is a still further object of the present invention to have the discs or screen become rinsed by jets of water. It is a still further object of the invention to cause a spinning movement of the discs or the cylindrical screen of screen filters, during the flushing phase.

SUMMARY OF THE INVENTION

According to the invention there is provided a liquid filtering device, particularly for irrigation water installations, of the type comprising a housing with an inlet port and an outlet port and a cylindrical filter member installed within the housing. Water flowing from the inlet to the outlet enters the filter member in a radial direction and discharges interiorly in an axial direction, and vice-versa during reversed, filter flushing flow of water from the outlet to the inlet.

An enclosed, centrally located chamber is defined by a wall which extends distantly inside of and along the filter member A series of nozzles is associated with the wall so that water under pressure in the chamber is discharged in jet forms Valve means provided is responsive to the reversed flow, to direct the flushing water into the chamber. Further provided is a fixed member at one side, and a displaceble clamping member at the other side of the filter member with means for urging the displaceable member against the filter member and the fixed member and pressure responsive means operatively associated with the displaceable member urging means. The arrangement is such that upon reverse of flow and water pressure built within the chamber, the displaceable member is moved away from the filter member, loosening the clamping engagement thereof and the water jets are sprayed to rinse the filter member. The filter member may be of the disc type or of the screen or the like unitary body filter type.

Preferably, the jets are sprayed at an angle with respect to the radial direction, so that the discs or screen are forced to spin during the rinsing thereof.

The displaceable member may form a part of a hydraulic cylinder, movable under the pressure of the reverse flushing water in the said chamber, the cylinder being spring-loaded in the clamping direction of the discs. According to one embodiment, the said valve means comprises a diaphragm or a slidable disc valve alternatively, an arrangement including an expandable sleeve is used to direct the flushing water into the nozzles.

BRIEF DESCRIPTION OF THE DRAWINGS

Further constructional features and advantages of the present invention will become more fully appreciated in the light of the ensuing description of a few preferred embodiments thereof, given by way of example only with reference to the accompanying drawings, wherein—

DETAILED DESCRIPTION OF THE PREFERRED EMBODIMENTS

Figure 1:
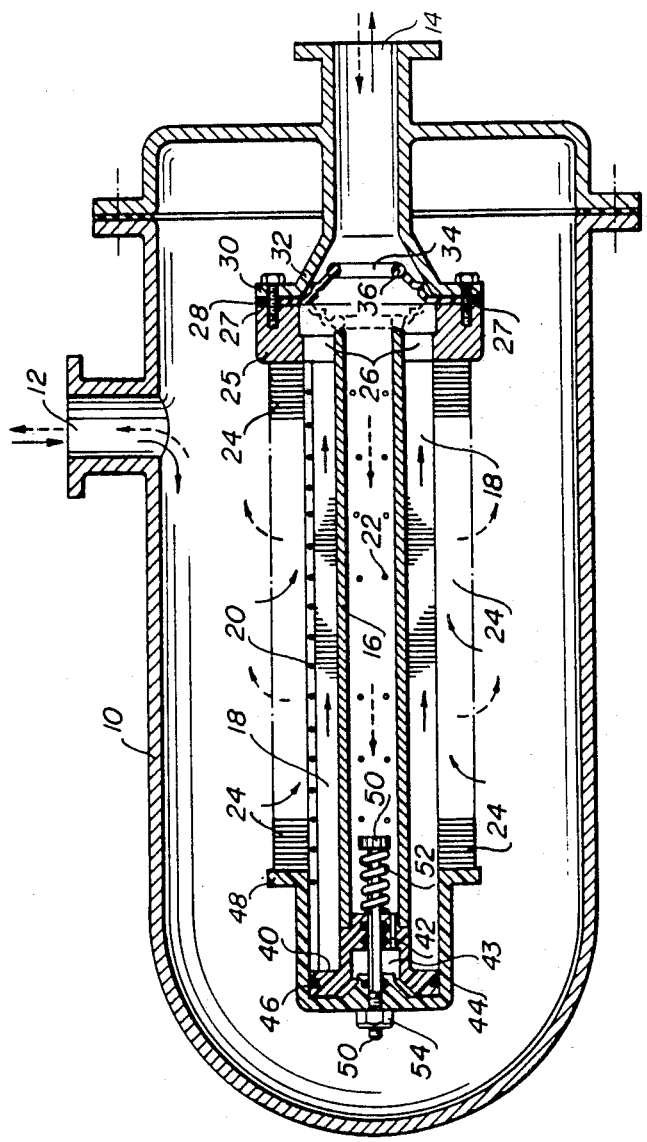
FIG. 1 is a cross-sectional view of a disc filter according to one embodiment of the present invention.

The disc filter shown in FIG. 1 comprises a housing 10 with an inlet port 12 and an outlet port 14. As stated above, a battery of such filters is usually installed, in parallel, to feed a single main irrigation line (not shown). The filter further comprises a centrally-installed elongated pipe section 16 carrying a number, say four, ribs 18 (see FIG. 3). For purposes to be explained further below, the ribs are affixed to the pipe 16 at a certain tilted position with respect to the radial direction, and are provided with a series of orifices or nozzles 20 communicating with openings 22 formed in the pipe 16. A pack of filter discs 24 of the conventional type is supported—in a freely rotatable manner—by the longitudinal edges of the ribs 18, as best seen in FIG. 4. Firmly seated at the leading end of the pipe 16 there is mounted a flange 25 with passages 26 provided around its inner diameter for the forward, filtering flow of the water. Facial ring surface 27 of the flange 25 is made to support an annular diaphragm 28.

The diaphragm 28, made of stiff rubber or the like flexible material, is clamped between the sturface 27 and a complementary flange 30 of outlet port member 32. The diaphragm 28 comprises a central opening 34 encircled by an annular seal 36, and is so designed that under a pressure from one or the other sides it flexes between the two positions shown in full and in broken lines respectively; when in the reverse flushing phase, water flows into and through the port 14 (broken line arrows) and the diaphragm will assume the lefthand side, "closed" position; however, during normal, forward flow of the water, the diaphragm will assume an "open" position where water entering the filter through inlet 12 may pass through the pack of discs 24, along the outside of the pipe 16 and through the passages 26 to become discharged through outlet port 14, as denoted by the full line arrows in FIG. 1. The disc-releasing mechanism is shown at the trailing, lefthand side of FIG. 1, and comprises a piston member 40, fixedly mounted at the end of the pipe 16.

A throughgoing passage 42 is formed at the bottom wall of the piston 40, to communicate with piston chamber 43. A cup-shaped cylinder member 44 is slidably mounted on the piston 40, with a sealing gasket 46, and comprises a flanged portion 48 which abuts against one side of the pack of discs 24.

The piston and cylinder members are forced one against the other by a spring loading arrangement such as bolt 50 passing through the bottom walls of the piston 40 and the cylinder 44 with coil spring 52 therearound, a nut 54 is provided for adjusting the force of the spring 52 effective for tightening the filtering discs pack 24 by the cylinder 44 against the fixed flange 25.

Figure 2:
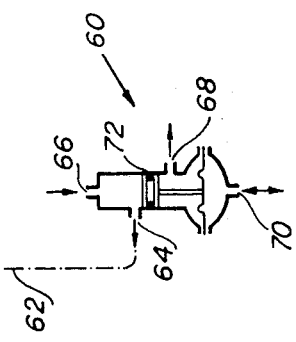
FIG. 2 shows the disc-compacting member of the filter of FIG. 1 in its displaced, operative position, with an optional connection to an external control valve.
Figure 2:
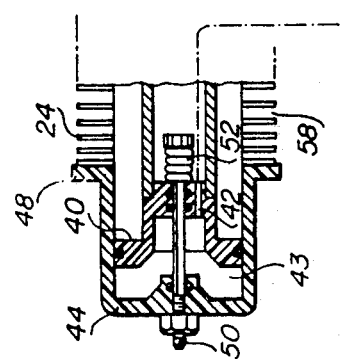

The operation of the device as so far described will now be evident with particular reference to FIG. 2. Hence, when the water flow direction is reversed, namely, water is charged through outlet port 14, it will first cause the diaphragm 28 to close the path defined between the ribs 18 along the outside of pipe 16. Under pressure, water will therefore fill the interior of pipe 16 and be discharged in the form of jets through nozzles 20 in a somewhat tangential direction with respect to the discs 24. Moreover, water pressure admitted through passage 42 to the chamber 43 at the inside of the piston 40 will cause the displacement of the cylinder 44, against the force of the spring 52 which will become contracted as shown in FIG. 2. The pack of discs 24 will loosen and, under the action of the jets emerging from the nozzles 20, the discs will become more-or-less evenly spread, with spaces 58 therebetween (FIG. 2), allowing an effective rinsing of any dirt that may have been trapped therebetween. Furthermore, due to the tilted angle of the water jets, and the discs being freely seated over the ribs 18 (FIG. 4), the discs will individually start to rotate about the supporting ribs 18, further enhancing the rinsing effect of the water jets. When the water flow direction is changed, the pressure of water within the pipe 16 and piston 40 will immediately drop to the nearly atmospheric pressure prevailing at the outlet port 14. Consequently, the spring 52 will cause the re-engagement of the discs 24 by the cylinder 44, which resumes its initial, tightening position shown in FIG. 1. The diaphragm 28 will move away from the mouth of the pipe 16 and the normal, filtering water flow path through the pack of discs 24, along the outside of the pipe 16 and through passages 26 will again be attained.

As further shown in FIG. 2, there is provided a hydraulic control device generally denoted 60, of a conventional type, which may be employed, in suitable cases, for positively and externally controlling the displacement of the cylinder 44 (rather than to depend on the pressure difference prevailing inside the pipe 16 in the complete automatic mode of operation just above described). According to this modified embodiment, the passage 42 is connected, e.g. by a thin pipe, (as represented by the dash-dotted line 62) leading through the inside of pipe 16 to outside the system, and to the diaphragm-operated control device 60. Basically, the device comprises four ports: Control port 64 connected to the piston chamber 43; water supply port 66; vent port 68; and regulation port 70. The device is actuated by hydraulic or pneumatic pressure pulses fed through port 70 for displacing piston 72. In the illustrated position of control device 60, water supply under the network pressure is allowed to reach the interior of the piston 40 while the control piston 72 is in the vent-closing position. At the end of the flushing cycle, a control pressure will cause the piston 72 to close the port 66 and allow communication between ports 64 and 68. Under the water pressure prevailing within the housing 10 (and/or the force of the spring 52) the cylinder 44 will move to the right and tighten the disc pack 24, since zero pressure will prevail thereinside.

As before mentioned this arrangement will allow the release of the filtering discs pack irrespective of the pressure conditions prevailing within the system at any time. The spring 52 may be dispensed with, or at least may be made much softer.

Figure 5:
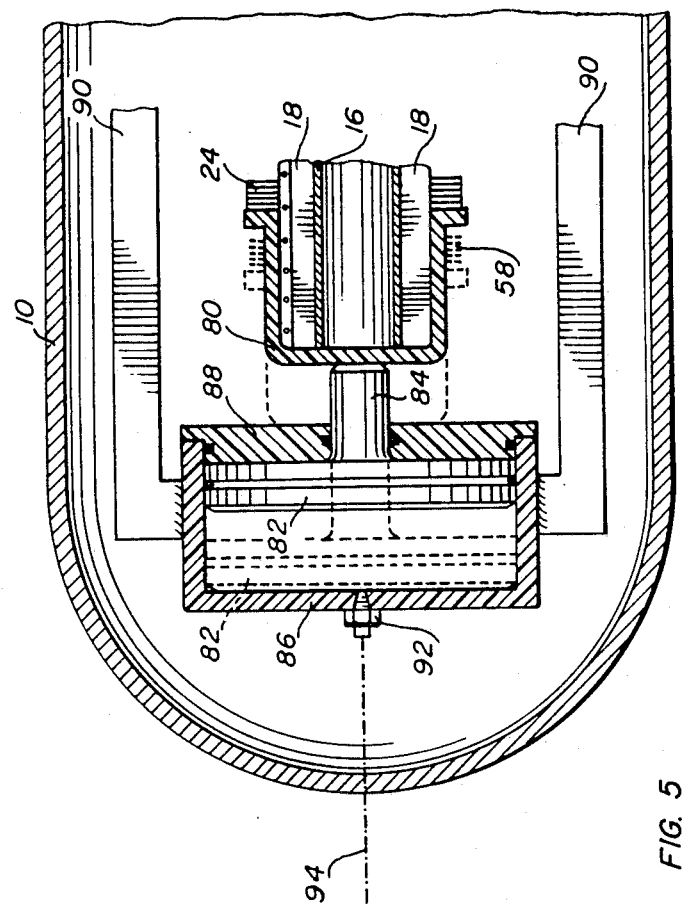
FIG. 5 shows an alternative, hydraulic cylinder operating device for displacing the disc-compacting member.

The embodiment of FIG. 5 differs from the preceding one essentially in that no counter-force spring is employed, i.e. it is purely hydraulically controlled and operated. Hence, a similar, disc-compacting displaceable member 80 is slidably mounted at the end of the pipe 16 and supported by ribs 18 (in basically the same manner as discs 24 proper are mounted). The member 80 is maintained in contact with a piston 82 via a central boss 84.

There is provided a cylinder member 86 with a closure 88, the cylinder 86 being maintained in its fixed, immovable position by, say, brackets 90 suitably connected to a fixed portion of the filter structure (not shown). The interior space of cylinder 86 communicates through a port 92 to a suitable control device (not shown) via a line 94. By suitably controlling the pressure within the cylinder 86 relative to the pressure prevailing within the housing 10, (whereby the effective differential forces will depend on the cross-sectional area of the piston 82 relative to that of the boss 84), control of the displacement of the member 80 is attained to release or to compact the filtering discs 24, as denoted by broken lines in FIG. 5.

Figure 6:
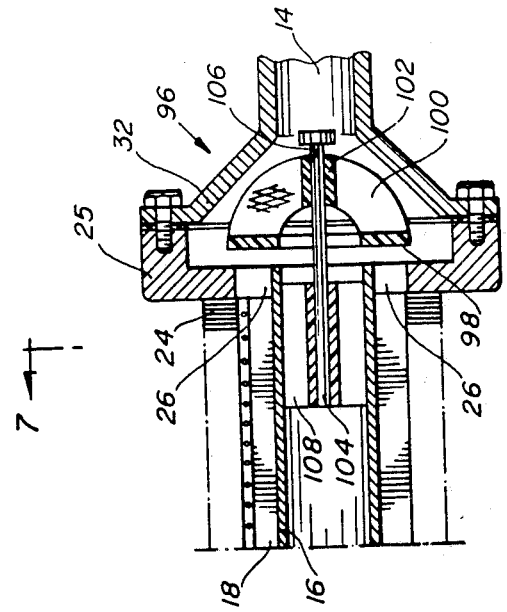
FIG. 6 is a cross-sectional view showing an alternative valve device responsive to reverse water flow.
Figure 7:
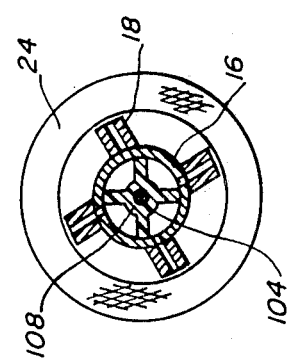
FIG. 7 is a cross-section taken along line 7—7 of FIG. 6.
Figure 8:
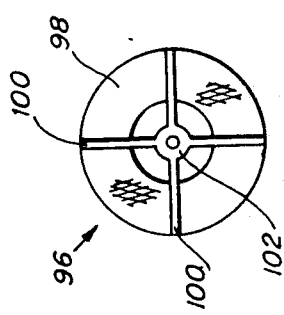
FIG. 8 is a plan view of the valve member of FIG. 6.
Figure 9:
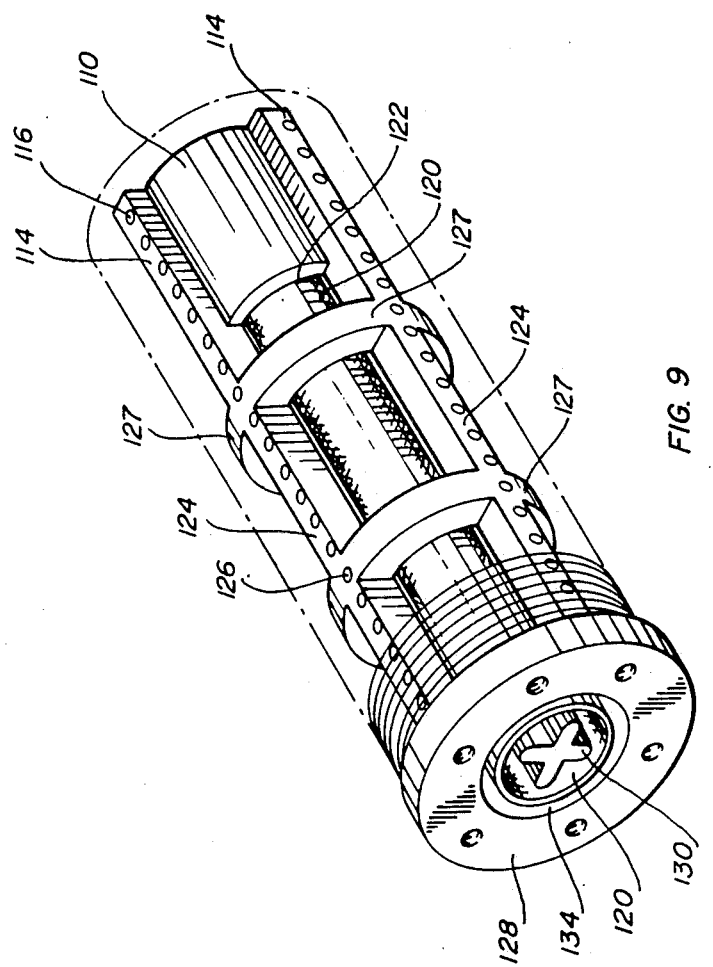
FIG. 9 shows an alternative structure of the inner filter member.
Figure 10:
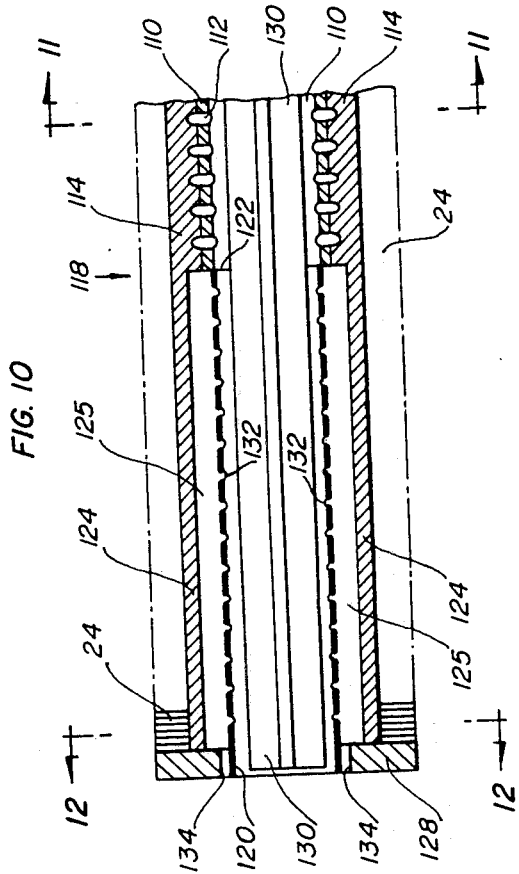
FIG. 10 is a cross-sectional view of FIG. 9.
Figure 11:
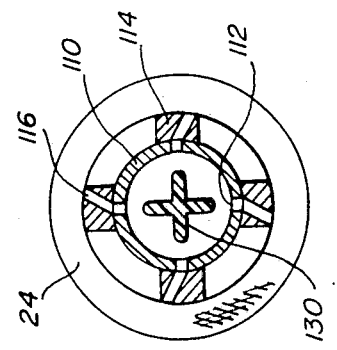
FIG. 11 is a cross-sectional view taken along line 11—11 of FIG. 10.

Turning now to FIGS. 6-8, a modified valve arrangement is shown for controlling the water flow during the filtering and the flushing modes of operation, respectively. The same reference numerals have been used wherever applicable. Rather than the bi-position diaphragm 28 (FIG. 1), a linear slidable flap valve member generally denoted 96 is provided, comprising a sealing ring 98 facing the passages 26, connected by ribs 100 to a slidable bushing or hub 102. The hub is freely supported on a rod 104 passing through bore 106 thereof.

The rod 104 is centrally fixed to the pipe 16, without impeding the flow of water therethrough, by a cross-shaped insert 108.

Depending on the direction of the flow, the flap valve will assume either an open position (with respect to the passages 26) or a closed position wherein flushing water will be directed into the pipe 16.

A further modification of the valving arrangement applicable to the invention as so far disclosed is given in FIGS. 9-13. The modification mainly cloncerns, the forward/reverse flow valving arrangement and the structure of the central, disc-bearing member, while the discs releasing and compacting arrangement remains the same as in any of the preceding embodiments.

Figure 3:
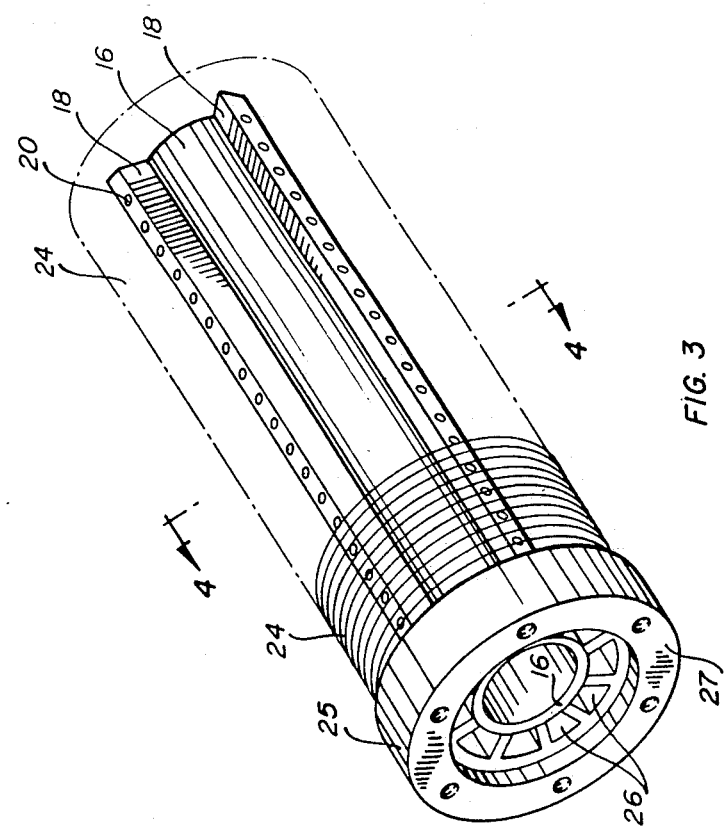
FIG. 3 is a schematic, three-dimensional view of the inner filter member.
Figure 4:
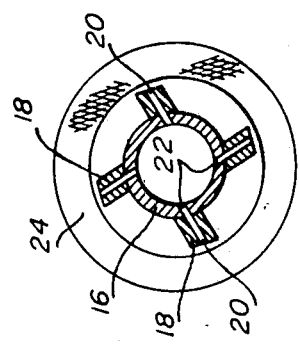
FIG. 4 is a cross-sectional view taken along line 4—4 of FIG. 3.
Figure 12:
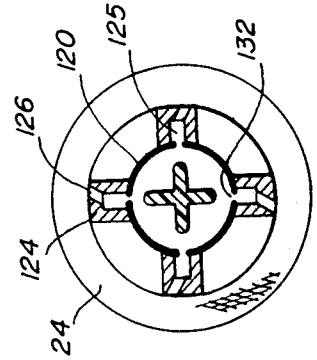
FIG. 12 is a cross-sectional view taken along line 12—12 of FIG. 10.
Figure 13:
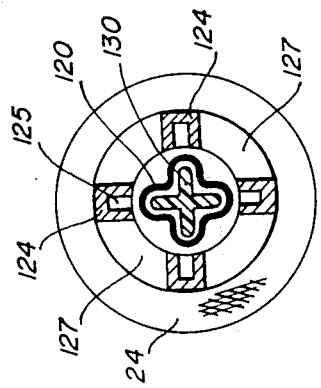
FIG. 13 shows the sleeve of FIG. 10 in its contracted state.

A pipe section 110 with orifices 112 (FIG. 11) and ribs 114 with nozzles 116 are provided at the trailing end of the device, all of which are basically the same as in the former embodiments (FIGS. 1, 3 and 4). However, towards the leading end, say at the region demoted 118, the stucture changes as follows: The pipe 110 is extended by a sleeve 120 made of a bendable material such as reinforced rubber, woven Nylon or the like, which is seamed to the pipe 110 around line 122. The solid ribs 114 also change into hollow, inverted U-shaped profiled ribs 124 with an elongated passage 125 and sidewise directing nozzles 126 (FIG. 12).

The ribs 124 are strengthened by ring sections 127, forming together with the ribs a cage-like structure, and bear at their front end a plain cylindrical mounting flange 128. Axially extending within the sleeve 120 and pipe 110 is an elongated core-member 130, which may be of any suitable profile such as the double-angled rod as shown.

In alignment with the hollow passages 125 of all the ribs 124, series of apertures 132 are formed in the sleeve 120. It will now be readily understood that the sleeve 120 functions as a flow-direction change responsive valve, in the following manner. Under normal operation, where water flows through the discs 24, the sleeve will become contracted or shrinked, i.e. pushed away from the cage structure (124-126) and actully wrapped around the core 130—as clearly shown in FIG. 13; should, however, occure a direction change of flow, namely into the opening or mouth 134 the flange 128, the sleeve 120 will immediately expand all along to, first, seal against further flow of water around the sleeve and directly to the discs battery 24, but rather direct it to the interior of the sleeve, and secondly, restrict the water to dischange through the apertures 132, into space 125, and become effectively ejected through the nozzles 126, as well as through the nozzels 116 of the remaining rib sections 114. It will be further noted that the different internal ribs cross-section configuration, namely the length of the ribs 114 relative to the remaining lengths of ribs 124, is determined by design considerations and may vary in order to satisfy other operational conditions of the device as a whole.

It has now been established that the releasable, spinning discs filtering device provided according to the invention, presents unique and advantageous features over the conventional installations. The periodical rinsings of the filter discs allow finer disc surfaces to be used, down to a few micrones of effective filtering mesh, which could not have been used in conventional devices because of frequent clogging that normal reverse flushing operations were ineffective to prevent.

Furthermore, when the clamping of the disc pack is resumed, the discs do not necessarily become engaged in the same angular position as before, which also contributes to the quality of the filtering.

The principles of the invention as so far outlined with particular reference to disc-type filters, are equally applicable to other, widely used types of filters, e.g. screen (plastic or metal) or wedge-wire filters (collectively referred to hereinafter as "unitary" filter members—as distinguish from the multiple discs based structure), as briefly discussed below with reference to FIGS. 14 and 15.

In the following description numerals with prefix "2" are used to denote parts corresponding to those of the fromer embodiments, it being understood that the various aspects, details of construction and alternatives specified in relation thereto are readily applicable, mutatis mutandis, to the instant, unitary filter version of the invention and need not to be repeated.

Figures 14, 15:
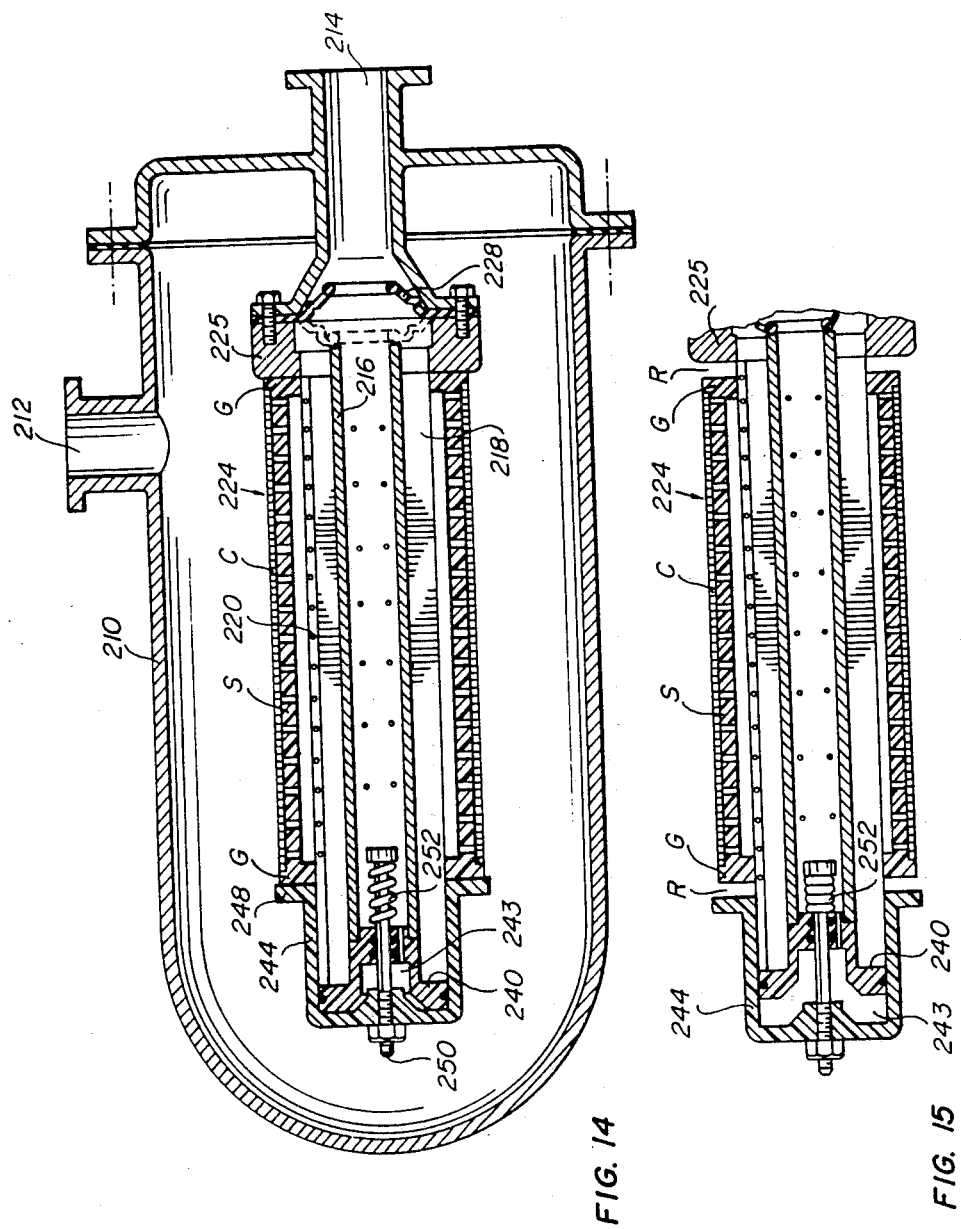
FIG. 14 is a cross-sectional view of a screen filter according to another embodiment of the present invention.
FIG. 15 shows the screen filter of FIG. 14 in its released, ready-to-spin state.

It will be thus evident from FIG. 14 that the pack of discs 24 of FIG. 1 is simply substituted by a unitary filter member 224. The filter 224 may be of the type comprising a cylinder C of perforated stainless-steel sheet dressed on an internal backing, plastic sleeve S with two collars G at each side thereof. It is placed and hold between the fixed flange 225 and the displaceable hydraulic cylinder 244 in the manner described with respect to the disc pack 24 of FIGS. 1 and 2.

In operation of the device, when the flow direction is reversed and cylinder 244 becomes displaced as shown in FIG. 15, gaps R are formed at each side and the filter member 244 will become free to revolve in the direction and under the impact of the water jets expelled through nozzles 220, while it is supported at its ends by the collars G. A most effective cleaning of the any dirt that may have adherred to the inner and outer surfaces of the filter 224 during the forward, filtering water flow therethrough is thus achieved.

It will be readily noted in this context that since only a very limited displacement of the cylinder 244 (or, for that purpose, cylinder 80—see FIG. 5 above) is required, its operative length may be considerably reduced. Furthermore, since no excessive clamping force is required (for positively pressing the discs together), a softer spring 252 can be used and, consequently, a smaller effective cross-sectional area of the cylinder 244 (or 80) will be required for overcoming its force.

Those skilled in the art will readily appreciate that various changes, modifications and variations may be applied to the invention as so far described without departing from the scope of the invention as defined in and by the appended claims.

What is claimed is:

1. A liquid filtering device, particularly for irrigation water installations of the type comprising a housing with an inlet port and an outlet port and a cylindrical filter member installed within the housing so that water flowing from the inlet to the outlet enters the filter member in a radial direction and discharges interiorly in an axial direction, and vice-versa during a reversed, filter flushing flow of water from the outlet to the inlet, the device being characterised by—
   an enclosed, centrally located chamber defined by a wall distantly extending inside of and along the filter member;
   a series of nozzles associated with the wall so that water under pressure in the chamber is discharged in jet forms;
   valve means responsive to the reversed flow, to direct the flushing water into the chamber;
   a fixed member at one side, and a displaceable member at the other side of the filter member;
   means for urging the displaceable member against the filter member to clamp same between the displaceable and the fixed members; and
   pressure responsive means operatively associated with the displaceable member urging means,
   the arrangement being such that upon reverse of flow and a water pressure built within the chamber, the displaceable member is moved away from the filter member loosening the clamping engagement thereof and the water jets are sprayed to rinse the filter member.

2. The device as claimed in claim 1 wherein the filter member is freely rotatable on support means provided between the fixed and the displaceable members, and the nozzle are directed at an angle with respect to the radial direction, so that the filter member is adapted to spin during the said rinsing thereof under the impact of the water jets.

3. The device as claimed in claim 1 wherein the said displaceable member forms part of a hydraulic cylinder communicated with the chamber and movable under the pressure of the reverse flushing water in the chamber.

4. The device as claimed in claim 3 wherein the cylinder is spring-loaded in the direction of the filter member.

5. The device as claimed in claim 4 wherein the displacement of the cylinder is controlled by external pressure operated regulating means.

6. The device as claimed in claim 5 wherein the filter member is freely mounted on at least three ribs extending along and externally of the chamber wall, said nozzles being provided through the ribs.

7. The device as claimed in claim 1 wherein the valve means comprise an annular diaphragm, which is adapted to close the axial discharge water flow about the chamber wall to the outlet port, and direct the flow from the outlet port into the chamber.

8. The device as claimed in claim 1 wherein the said valve means comprises a linear slidable flap valve, mounted on a rod axially extending with respect to and projecting from the chamber.

9. The device as claimed in claim 8 wherein the flap valve comprises an annular disc member adapted to close the axial discharge water flow about the chamber wall to the outlet port, and direct the flow from the outlet port into the chamber.

10. The device as claimed in claim 1 wherein the said valve means comprise a sleeve of a bendable sheet material, constituting the chamber, and provided with series of apertures extending along its wall, the nozzles are provided in elongated ribs forming a part of a cage-like structure and an elongated core-member extends within the sleeve, the arrangement being such that water admitted from the inlet port through the filter member will cause the sleeve to contract and become wrapped around the core-member, and flushing water flowing from the outlet port will cause the sleeve to inflate and become forced against the said ribs so that the water passes through the apertures and into the nozzles.

11. The device as claimed in claim 10 wherein the said sleeve is made of reinforced rubber.

12. The device as claimed in claim 1 wherein the filter member consists of a plurality of discs with roughened side surfaces in compact, side-by-side juxtposition.

13. The device as claimed in claim 2 wherein the filter member comprises a metal or plastic screen.

14. The device as claimed in claim 13 wherein the screen is provided with annular collars at its two ends forming the rotatable support of the filter member.

* * * * *